United States Patent [19]

Chen et al.

[11] Patent Number: 5,450,595
[45] Date of Patent: Sep. 12, 1995

[54] MULTIPLE HASH TABLES BASED ON ACCESS FREQUENCY

[75] Inventors: Ming-Syan Chen, Yorktown Heights, both of; Philip S. Yu, Chappaqua, N.Y.

[73] Assignee: International Business Machines Corporation, Armonk, N.Y.

[21] Appl. No.: 196,923

[22] Filed: Feb. 15, 1994

[51] Int. Cl.⁶ ............................................. G06F 12/14
[52] U.S. Cl. ........................... 395/600; 364/DIG. 1; 364/228.1; 364/246.8; 395/421.06
[58] Field of Search ................................ 395/650, 725

[56] References Cited

U.S. PATENT DOCUMENTS

| | | | |
|---|---|---|---|
| 4,399,504 | 8/1983 | Obermarck et al. | 395/DIG. 1 |
| 4,480,304 | 10/1984 | Carr et al. | 395/DIG. 1 |
| 4,965,719 | 10/1990 | Shoens et al. | 395/DIG. 1 |
| 4,975,833 | 12/1990 | Jinzaki | 395/DIG. 1 |
| 5,032,987 | 7/1991 | Broder et al. | 395/DIG. 1 |
| 5,109,511 | 4/1992 | Nitta et al. | 395/650 |
| 5,140,321 | 8/1992 | Jung | 341/55 |
| 5,142,676 | 8/1992 | Fried et al. | 395/425 |
| 5,161,227 | 11/1992 | Dias et al. | 395/650 |

FOREIGN PATENT DOCUMENTS 1-303527 12/1989 Japan.
3-40168 2/1991 Japan.

*Primary Examiner*—Thomas M. Heckler
*Attorney, Agent, or Firm*—Heslin & Rothenberg

[57] ABSTRACT

An access frequency is determined for each data unit in a data sharing environment employing a hashing scheme, either from an estimate or from a history of data accesses. The data units are then categorized into access frequency classes. Available hash entries are then allocated among the various access frequency classes, with more hash entries being allocated to relatively higher access frequency classes. Once the hash entries are allocated, the data units are allocated to the hash entries in a given access frequency class. In the simplest form, the data units are evenly allocated among the hash entries of a given access frequency class.

20 Claims, 2 Drawing Sheets

MULTIPLE HASH TABLES BASED ON ACCESS FREQUENCY

BACKGROUND OF THE INVENTION

1. Technical Field

The present invention generally relates to data sharing management. More particularly, the present invention relates to hashing schemes.

2. Background Art

In a data sharing environment, different transactions running on different nodes or central electronic complexes (hereinafter, CEC) may require access to and the ability to alter the contents of the same data unit at the same time. Where two or more CECs require access to the same data unit and any one of them needs to modify the contents thereof, versus all merely reading the contents, that situation is referred to as a "real contention". To avoid real contentions, each access to a shared data unit is accomplished via a request, lock and release arrangement. However, this arrangement requires tracking the availability of each data unit; possibly a burdensome task for the data sharing environment. To reduce this burden, hashing schemes have been developed.

A hashing scheme provides concurrency control; that is, it tracks the use of data units and prevents concurrent modifications thereto. Hashing schemes utilize a hash table, having few entries relative to the number of data units, into which access information is mapped. Which hash entry a given data unit will be paired with is determined through the use of a hash function.

As an example of a hash function, consider a data sharing environment having thousands of data units and 100 hash table entries, from 0 to 99. A data unit number is examined to determine if it is more than two digits; if so, the data unit number is truncated to the last two digits. Thus, data unit number 1034 would correspond to hash table entry 34. This process of examination and truncation is the hash function.

Although existing hashing schemes effectively prevent concurrent modifications to the same data unit, they often result in a high rate of occurrence of "false contentions". False contentions occur when there is no real contention, but the data unit(s) attempting to be accessed are hashed to the same hash entry. In the above example, a false contention would occur if data units 634 and 1034 were requested to both be modified, both be read from, or one read from and one modified, since both would correspond to hash entry 34. Since the two data units are different, access would be allowed, however, resources are wasted in resolving the false contention; that is, determining that the contention is false rather than real. Thus, it would improve efficiency if a hashing scheme were developed that decreases the likelihood of false contentions.

One way to accomplish the goal of decreasing the likelihood of concurrent hashes to the same hash entry is to increase the size of the hash table; that is, to increase the number of hash table entries. Given the same number of data units, an increase in the number of hash table entries would result in fewer data units corresponding to the same entry, decreasing the likelihood of concurrent hashes to the same entry. However, this simple solution runs counter to the purpose of the hashing scheme to minimize the resources required to track data unit accesses; in this case, to decrease the size of the hash table. An increase in hash table size would actually require a greater amount of valuable memory space.

Another way to decrease the likelihood of false contentions is to choose a smaller data unit, such as records instead of pages. This would allow access to different records within the same page. However, when the data unit size is small, many access requests must be processed, utilizing a greater amount of valuable resources and/or taking a significantly longer time to process.

Thus, a need exists for a hashing scheme that minimizes the number of false contentions without overburdening resources.

SUMMARY OF THE INVENTION

Briefly, the present invention satisfies the need for a hashing scheme minimizing the number of false contentions without overburdening resources by providing a hashing scheme that pairs data units to hash entries based on the frequency of access for a given data unit relative to other data units in the same data sharing environment.

A method for reducing false contention occurrences in a data sharing environment is presented. The data sharing environment employs a hashing scheme including a hash table having a plurality of hash entries. Data access frequency is first determined for the shared data. The hash table is then partitioned based on the access frequency determination.

The data access frequency determination may be accomplished by estimating an access frequency for the shared data, which may be in the form of data units. The data access frequency may also be determined from an access history for the shared data. The step of determining further comprises categorizing the data into at least two different access frequency classes. The step of partitioning comprises partitioning the table into at least two subtables, each subtable corresponding to an access frequency class. A higher frequency access class relative to another access frequency class is allocated more hash entries than the other class. The step of partitioning may be replaced by a step of allocating a hash table of a different size to each of the access frequency classes, with a higher frequency class being allocated a relatively larger hash table.

These, and other objects, features and advantages of this invention will become apparent from the following detailed description of the invention taken in conjunction with the accompanying drawings.

BEST MODE FOR CARRYING OUT THE INVENTION

The present invention provides a hashing scheme that divides the hash table into different sized subtables (or provides multiple hash tables of different sizes) for data unit access requests with different access frequencies to minimize the number of false contentions in a data sharing environment, such as, for example, a local area network.

In general, there are two basic types of data unit access requests. The first type of access request is a shared access request, where the data unit is to be read from only (hereinafter, an "S request"). Multiple S requests for the same data unit may be granted concurrently, since no modifications to the data unit contents will be made. The second type of access request is an exclusive access request, where the data unit contents will be modified in some way (hereinafter, an "X request"). Multiple X requests for the same data unit cannot be granted concurrently, since modification of the contents thereof will take place.

Multiple accesses to the same data unit are compatible only if they are all S type accesses. In all other cases, accesses to the same data unit are incompatible. Incompatible accesses to the same data unit present a real contention situation. Compatible accesses to the same data unit present a false contention situation.

Figure 1:
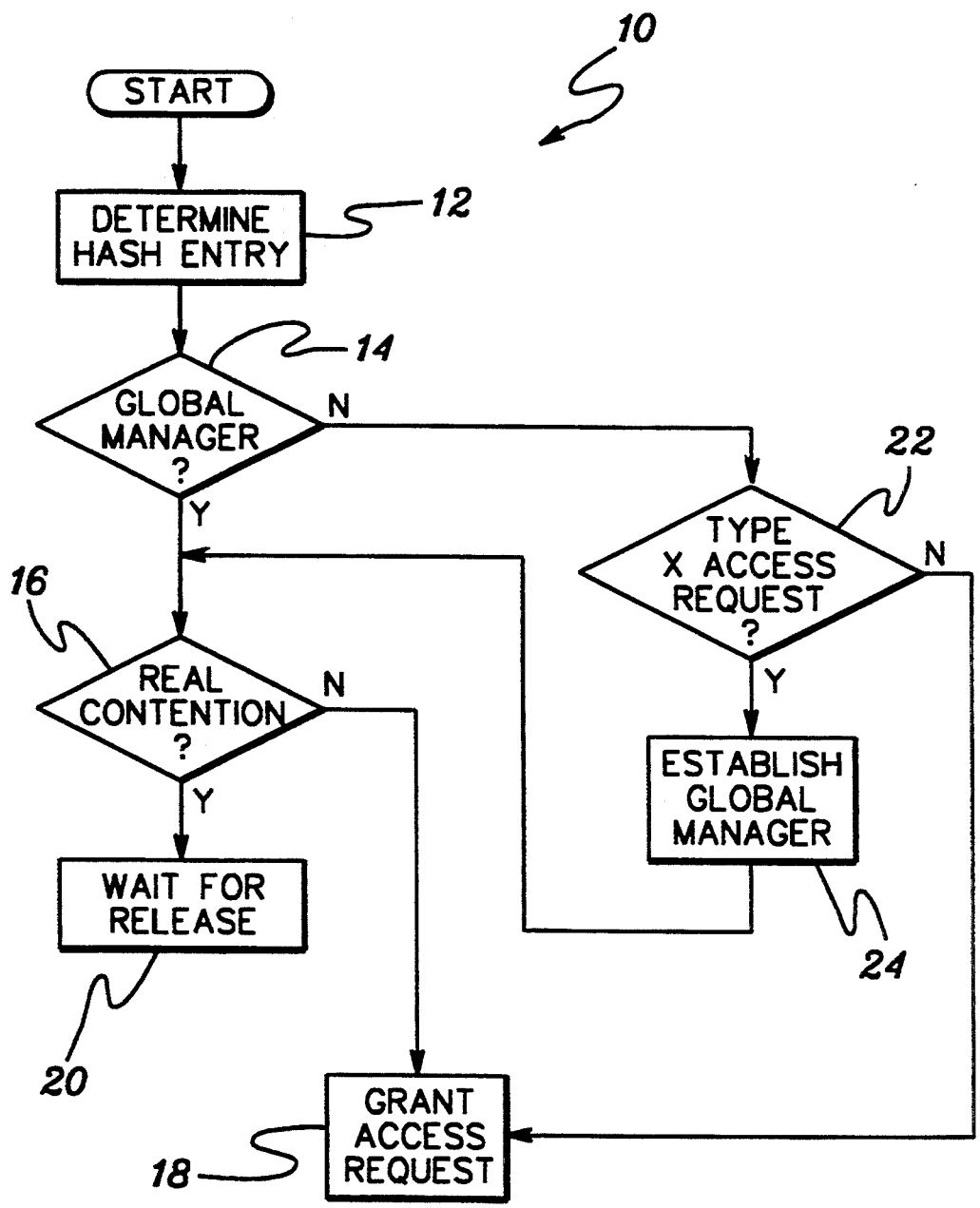
FIG. 1 is a flow diagram for one prior art scheme for managing data unit access requests.

A description of one type of scheme for handling access requests will now be given in conjunction with the flow diagram 10 of FIG. 1. A locking facility initially controls access to the data units by CECs therein. A data unit is often a page of data, i.e., four kilobytes of data. A particular page of data may contain one or more records, depending on their size of the record(s). A "locking facility" is usually a computer program residing in shared memory.

A request for access to a data unit is sent from a given CEC to the locking facility. The locking facility first determines, via the hashing function, which hash entry corresponds to the data unit requested, STEP 12 "DETERMINE HASH ENTRY". The locking facility then checks to see if a global manager exists for the hash table entry corresponding to that data unit (the locking facility stores the identity of all global managers), INQUIRY 14 "GLOBAL MANAGER?". If there is a global manager, the locking facility inquires of the global manager if the current request will cause a real or a false contention, INQUIRY 16 "REAL CONTENTION?". If the global manager indicates the access would cause a false contention, the locking facility will grant the access request, STEP 18 "GRANT ACCESS REQUEST". If the global manager indicates the access would cause a real contention, the access request is denied and the requesting CEC must wait until the data unit in question is released, STEP 20, "WAIT FOR RELEASE". If there is no global manager, the locking facility checks to see which type of access request is being made, INQUIRY 22 "TYPE X ACCESS REQUEST?". If the access request is of type X, the locking facility assigns the CEC making the access request to be the global manager, STEP 24 "ESTABLISH GLOBAL MANAGER", and makes INQUIRY 16. If the request is not of type X, i.e., is of type S, the access request is granted, STEP 18 "GRANT ACCESS REQUEST". If a global manager is assigned, the locking facility stores its identity. The use of the global manager to resolve false contentions comes at the cost of needless use of resources and efficiency degradation. Thus, minimizing false contentions would decrease resource usage and improve efficiency.

A global manager of a given hash table entry tracks which parties are accessing data units corresponding to that hash entry and informs the locking facility whether a given access request will cause a real or false contention. A CEC made global manager by the locking facility remains the global manager until releasing the particular data unit accessed thereby. If there are other accesses corresponding to that hash entry taking place when the CEC steps down as global manager, another CEC that accessed a data unit corresponding to that hash entry closest in time to the CEC stepping down will become the global manager.

Figure 2:
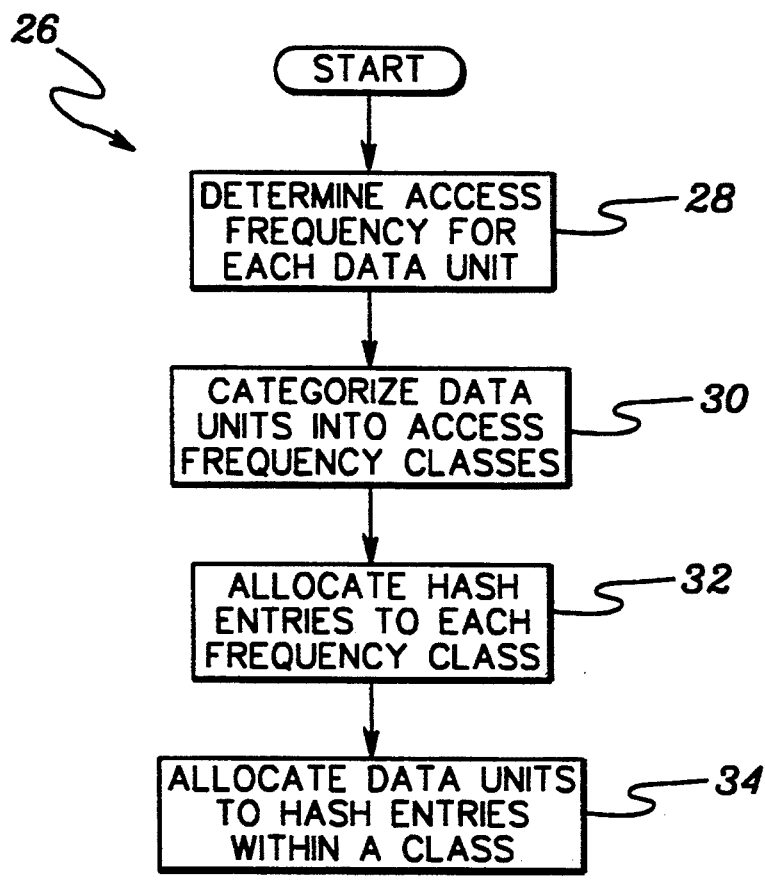
FIG. 2 is a flow diagram for a hashing scheme according to the present invention.

FIG. 2 is a flow diagram 26 of a method for partitioning a hash table based on access frequencies of data units hashed thereto, in order to reduce false contention occurrences in a data sharing environment, according to the present invention. A history of data unit accesses is preferably available, however, data unit accesses may also be estimated if no such history is available. From the history or from an estimate, an access frequency is determined for each data unit, STEP 28 "DETERMINE ACCESS FREQUENCY FOR EACH DATA UNIT".

After an access frequency is determined for each data unit (STEP 28), the data units are categorized into access frequency classes, STEP 30 "CATEGORIZE DATA UNITS INTO ACCESS FREQUENCY CLASSES". The number of access frequency classes will depend on a given data sharing environment. Preferably, at least two access frequency classes are chosen. Each class will contain data units in a particular access frequency range. For example, three access frequency classes could be chosen; one for data units frequently accessed, one for data units of a medium access frequency and one for data units rarely accessed.

Figure 3:
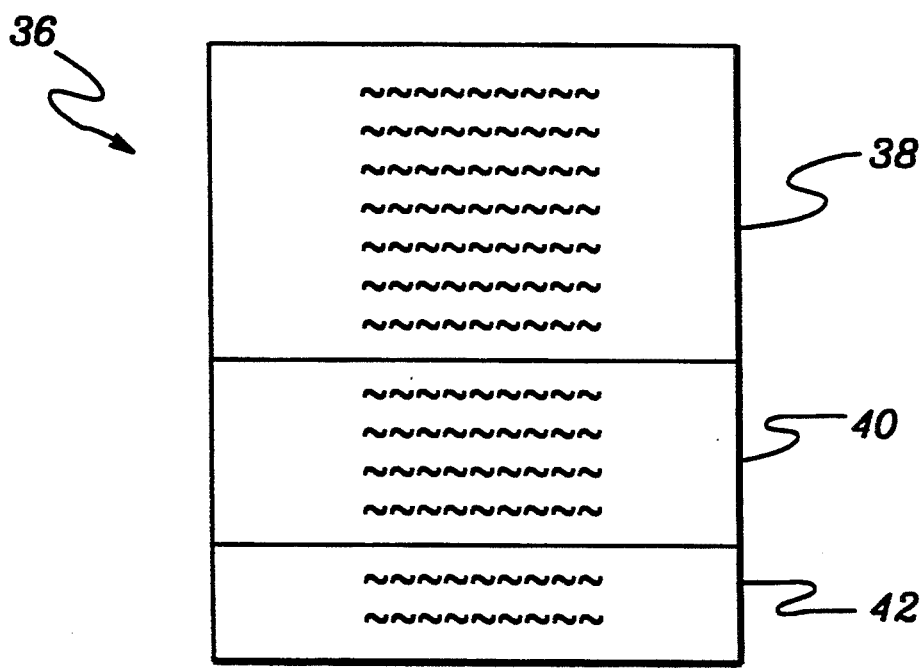
FIG. 3 visually depicts a hash table partitioned into subtables according to the present invention.

Once the data units are categorized into access frequency classes (STEP 30), the hash entries are allocated to each frequency class, STEP 32 "ALLOCATE HASH ENTRIES TO EACH FREQUENCY CLASS". The number of hash entries allocated to a given access frequency class directly depends on the frequency range relative to the other classes. The higher the frequency range relative to the other classes, the greater the number of hash entries allocated thereto. Spreading higher frequency data units among a larger number of hash entries results in a given hash entry corresponding to a smaller number of data units, decreasing the likelihood that a given access will cause a false contention. FIG. 3 visually depicts the partitioning of a hash table 36 for three access frequency classes. The highest access frequency class would be allocated the most hash entries, shown as subtable 38. A medium access frequency class would be allocated a lower number of hash entries, shown as subtable 40. The lowest access frequency class would be allocated the least number of hash entries, shown as subtable 42. The particular algorithm of the present exemplary embodiment for determining the number of hash entries per class will subsequently be described.

After the number of hash entries has been determined for each of the access frequency classes (STEP 32), the data units within each class are allocated to the hash entries corresponding to that class, STEP 34 "ALLOCATE DATA UNITS TO HASH ENTRIES WITHIN A CLASS". The simplest allocation of data units within a class to the hash entries corresponding thereto is to allocate them evenly. However, there could be, for example, a gradation of the number of data units allocated to the hash entries within the frequency range of that particular class. As another example, an access frequency class could be subdivided further and each subdivision spread evenly among the hash entries for that class.

The algorithm employed by the present invention to partition an aggregate size hash table based on the access frequencies of the data units hashed thereto will now be described. Let m be the number of different frequency classes of access requests. As a practical matter, although the present algorithm works with only one frequency class, real benefits are not realized with less than two different frequency classes. $\lambda_i$ is an arrival rate for class i access requests in requests per second. Note that $1 < i < m$.

$$\sum_{i=1}^{m} \lambda_i = \lambda;$$

that is, the summation of arrival rates for all classes of access requests in a given data sharing environment equals $\lambda$. Let $p_i^x$ be the probability of an X type access request for class i access requests and $p_i^s$ be the probability of an S type access request for class i access requests, where $p_i^x + p_i^s = 1$. The total number of hash entries in the hash table is denoted H and $H_i$ is the number of hash entries corresponding to class i access requests. Let T be an average transaction response time. As used herein, the term "transaction" refers to a particular job, which may involve one or more data unit accesses to the same or different data units. The average transaction response time includes access delays due to real contentions. The number of existing class i accesses may be approximated as $\lambda_i T$. Note that two S type accesses to the same data unit are compatible. Thus, the probability of seeking a global manager for X type class i access requests may be approximated as $$\frac{\lambda_i T}{H_i},$$

and the probability of seeking a global manager for an S type class i access request may be approximated as $$\frac{\lambda_i T p_i^x}{H_i}.$$

The probability of false contentions, $f(H_i, H_2, \ldots, H_m)$, is proportional to:

$$f(H_1, H_2, \ldots, H_m) = \sum_{i=1}^{m} \left( p_i^x \frac{\lambda_i T}{H_i} + p_i^s \frac{\lambda_i p_i^x T}{H_i} \right) \frac{\lambda_i}{\lambda}$$

$$= \frac{T}{\lambda} \sum_{i=1}^{m} \frac{\lambda_i^2 p_i^x (1 + p_i^s)}{H_i}$$

Thus, we would like to obtain the vector $<H_1, H_2, \ldots, H_m>$ that minimizes f in equation (1) above in such a way that the summation of $H_i$ for i from 1 to m equals H.

The task is made easier by solving for a vector $<k1, k2, \ldots, km>$ that minimizes g in equation (2) below such that the summation of all $k_i$ for i from 1 to m equals K; that is, $$\sum_{i=1}^{m} k_i = K.$$

$$g(k_1, k_2, \ldots k_m) = \sum_{i=1}^{m} \frac{a_i}{k_i}, \quad (2)$$

where $a_1, a_2, \ldots, a_m$ are given. It can be proved that:

$$k_i = \frac{\sqrt{a_i} K}{\sum_{j=1}^{m} \sqrt{a_j}} \quad (3)$$

will yield a minimal g given by:

$$g = \frac{\left( \sum_{j=1}^{m} \sqrt{a_j} \right)^2}{K}. \quad (4)$$

From the solution to equation (2) above, it follows that:

$$f = \frac{T \left( \sum_{j=1}^{m} \lambda_j \sqrt{p_j^x (1 + p_j^s)} \right)^2}{\lambda H}, \quad (5)$$

and $$H_i = \frac{\lambda_i H \sqrt{p_i^x (1 + p_i^s)}}{\sum_{j=1}^{m} \lambda_j \sqrt{p_j^x (1 + p_j^s)}}. \quad (6)$$

An exemplary implementation of the above algorithm in a simplified data sharing environment will now be given. Consider a data sharing environment having data pages and index pages. Assume that accesses to data pages are more frequent relative to accesses to index pages. Thus, there are two frequency classes, i.e., $m = 2$. Assume also that data pages are more likely to be modified and index pages are more likely to be read from. Thus, access requests for data pages will be mostly X requests and access requests for index pages will be mostly S requests. In addition, assume that access frequency among the same page type is evenly distributed.

Since accesses to data pages are more frequent in the above environment than accesses to index pages, false contentions are more likely to occur with data pages. Thus, increasing the number of hash entries corresponding to the class of data pages would decrease the number of data pages corresponding to each of those hash entries, thus decreasing the likelihood of false contentions in data page accesses.

From equation (6), the algorithm for the above exemplary environment is given as:

$$H_I = \frac{\lambda_I H \sqrt{p_I^x (1 + p_I^s)}}{\lambda_I \sqrt{p_I^x (1 + p_I^s)} + \lambda_D \sqrt{p_D^x (1 + p_D^s)}}, \quad (7)$$

and $$H_D = \frac{\lambda_D H \sqrt{p_D^x (1 + p_D^s)}}{\lambda_I \sqrt{p_I^x (1 + p_I^s)} + \lambda_D \sqrt{p_D^x (1 + p_D^s)}}. \quad (8)$$

In equations (7) and (8) above, H is the total number of hash entries, $H_I$ is the number of hash entries corresponding to index pages and $H_D$ is the number of has entries corresponding to data pages. The probability of an index page type X request and S request are denoted $p_I^x$ and $p_I^s$, respectively. Likewise, the probability of a data page type X request and S request are denoted $p_D^x$ and $p_D^s$, respectively. Finally, the arrival rates for index page and data page access requests are denoted $\lambda_I$ and $\lambda_D$, respectively.

As a numerical example, consider equations (7) and (8) where $\lambda_I = 290$ requests/second, $\lambda_D = 210$ requests/second, $p_I^x = 0.01$, $p_I^s = 0.99$, $p_D^x = 0.9$, $p_D^s = 0.1$, $H = 9,999$ and $T = 1$ second. From equations (7) and (8), we have $H_I = 1,645$ and $H_D = 8,354$. From equation (5), we also find that the probability of a false contention is 0.012.

While one aspect of the present invention has been described and depicted herein, alternative aspects may be effected by those skilled in the art to accomplish the same objectives. Accordingly, it is intended by the appended claims to cover all such alternative aspects as fall within the true spirit and scope of the invention.

We claim:

1. A method for reducing false contention occurrences in a data sharing environment employing a hashing scheme including a hash table having a plurality of hash entries, said method comprising:
   determining data access frequency for said shared data; and
   partitioning said hash table based on said determined data access frequency.

2. The method of claim 1 wherein said step of determining comprises determining said data access frequency form a history of accesses of said shared data.

3. The method of claim 1 wherein said step of determining comprises estimating said data access frequency.

4. The method of claim 1, wherein said shared data comprises a plurality of data units, wherein said hashing scheme comprises hashing said plurality of data units to said plurality of hash entries and wherein said step of determining comprises determining said data access frequency for each of said plurality of data units.

5. The method of claim 4 wherein said step of determining further comprises categorizing said plurality of data units into at least two different access frequency classes.

6. The method of claim 5, wherein said at least two different access frequency classes comprises a first class and second class, said first class corresponding to data units with higher access frequencies relative to said second class and wherein said step of partitioning comprises partitioning said hash table into at least two subtables, each subtable corresponding to one of said at least two different access frequency classes, a first subtable of said at least two subtables corresponding to said first class and a second subtable of said at least two subtables corresponding to said second class.

7. The method of claim 6, wherein said step of partitioning further comprises:
   determining a different number of said plurality of hash entries for each of said at least two subtables, wherein said first subtable comprises a greater number of said plurality of hash entries than said second subtable; and
   allocating said plurality of data units among said different number of said plurality of hash entries within a given one of said at least two subtables.

8. The method of claim 7, wherein said step of allocating comprises allocating said plurality of data units equally.

9. The method of claim 6, wherein possible access requests for said plurality of data units comprise at least two types of access requests and wherein said step of partitioning said hash table into at least two subtables comprises determining a number of said plurality of hash entries for each of said at least two subtables based on an arrival rate for said at least two types of access requests, a probability of a first type of access request of said at least two types of access requests, a probability of a second type of access request and a total number of said plurality of hash entries.

10. The method of claim 9, wherein said step of determining comprises determining said different number of said plurality of hash entries for a given subtable according to an equation comprising:

$$H_i = \frac{\lambda_i H \sqrt{p_i^1 (1 + p_i^2)}}{\sum_{j=1}^{m} \lambda_j \sqrt{p_j^1 (1 + p_j^2)}},$$

wherein:
$H_i$ = a number of hash entries for a subtable of class i access requests;
$\lambda_i$ = arrival rate of class i access requests;
$H$ = total number of hash entries in said hash table;
$p_i^1$ = probability for a class i first type request;
$p_i^2$ = probability for a class i second type request; and
$m$ = a total number of different classes.

11. A method for reducing false contention occurrences in a data sharing environment employing a hashing scheme, said method comprising:
   determining access frequency for said shared data;
   categorizing said shared data into a plurality of access frequency classes; and
   allocating a hash table of a different size to each of said plurality of access frequency classes, wherein a larger hash table is allocated to a higher access frequency class relative to another of said plurality of access frequency classes.

12. The method of claim 11, wherein said shared data comprises a plurality of data units and wherein said step of determining comprises determining an access frequency for each of said plurality of data units.

13. The method of claim 12, wherein possible access requests for said plurality of data units comprise at least two types of access requests including a first type and a second type, wherein each said hash table comprises a plurality of hash entries and wherein said step of allocating comprises determining a different number of hash entries for a given access frequency class based on a arrival rate for said at least two types of access requests, a probability of said first type of access request, a probability of said second type of access request and a total number of hash entries for all hash tables.

14. The method of claim 13, wherein said step of determining comprises determining said different number of hash entries for a given hash table according to an equation comprising:

$$H_i = \frac{\lambda_i H \sqrt{p_i^1 (1 + p_i^2)}}{\sum_{j=1}^{m} \lambda_j \sqrt{p_j^1 (1 + p_j^2)}}.$$

wherein:
$H_i$ = a number of hash entries for a hash table of class i access requests;
$\lambda_i$ = arrival rate of class i access requests;
$H$ = total number of hash entries for all hash tables;
$p_i^1$ = probability for a class i first type request;

$p_i^2$ = probability for a class i second type request; and m = a total number of different classes.

15. A method for reducing false contention occurrences in a computer system employing data sharing and a hashing scheme therefor including a hash table having a plurality of hash table entries, each of said plurality of hash table entries corresponding to at least one of a plurality of data units, wherein a history of data unit accesses exists for said computer system, said method comprising:

analyzing said history to determine an access frequency for each of said plurality of data units;

categorizing said plurality of data units into at least two access frequency classes, each of said plurality of data units being categorized based on said determined access frequency; and allocating a different number of said plurality of hash table entries to each of said at least two access frequency classes, wherein a higher access frequency class is allocated a larger number of said plurality of hash table entries relative to a lower access frequency class.

16. The method of claim 15 wherein said plurality of data units comprises a plurality of data pages.

17. The method of claim 15 further comprising allocating said plurality of data units within a given access frequency class among said different number of said plurality of hash table entries allocated to said given access frequency class.

18. The method of claim 15, wherein possible access requests for said plurality of data units comprise at least two types of access requests including a first type and a second type and wherein said step of allocating comprises determining said different number for a given access frequency class based on a arrival rate for said at least two types of access requests, a probability of said first type of access request, a probability of said second type of access request and a total number of said plurality of hash entries.

19. The method of claim 18, wherein said step of determining comprises determining said different number of said plurality of hash entries for a given subtable according to an equation comprising:

$$H_i = \frac{\lambda_i H \sqrt{p_i^1 (1 + p_i^2)}}{\sum_{j=1}^{m} \lambda_j \sqrt{p_j^1 (1 + p_j^2)}},$$

wherein:

$H_i$ = a number of hash entries for a subtable of class i access requests;

$\lambda_i$ = arrival rate of class i access requests;

H = total number of hash entries in said hash table;

$p_i^1$ = probability for a class i first type request;

$p_i^2$ = probability for a class i second type request; and m = a total number of different classes.

20. The method of claim 19 wherein said first type is characterized by an exclusive access and said second type is characterized by a shared access.

* * * * *